United States Patent
Sharma et al.

(10) Patent No.: US 10,572,666 B2
(45) Date of Patent: Feb. 25, 2020

(54) RETURN-ORIENTED PROGRAMMING MITIGATION

(71) Applicant: Microsoft Technology Licensing, LLC, Redmond, WA (US)

(72) Inventors: Shishir Sharma, Redmond, WA (US); Ten Tzen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/492,857

(22) Filed: Apr. 20, 2017

(65) Prior Publication Data

US 2018/0307838 A1  Oct. 25, 2018

(51) Int. Cl.
*G06F 11/30* (2006.01)
*G06F 21/56* (2013.01)

(52) U.S. Cl.
CPC .................. *G06F 21/566* (2013.01)

(58) Field of Classification Search
CPC .................... G06F 21/566; G06F 2221/033
USPC ........................................................ 713/188
See application file for complete search history.

(56) References Cited

U.S. PATENT DOCUMENTS

| | | |
|---|---|---|
| 7,254,586 B2 | 8/2007 | Chen et al. |
| 7,716,495 B2 | 5/2010 | Shupak et al. |
| 9,177,148 B2 | 11/2015 | Fischer |
| 9,361,266 B2 | 6/2016 | Bogdanov |
| 2003/0217277 A1* | 11/2003 | Narayanan .......... G06F 11/2284 713/187 |
| 2007/0277024 A1 | 11/2007 | Drepper |
| 2015/0113640 A1 | 4/2015 | Krten et al. |
| 2016/0042177 A1 | 2/2016 | Ben-haim |
| 2017/0046280 A1* | 2/2017 | Driessen ............. G06F 12/1408 |
| 2017/0140148 A1* | 5/2017 | Gleeson ................ G06F 21/125 |
| 2018/0089427 A1* | 3/2018 | Branco ..................... H04L 9/14 |

FOREIGN PATENT DOCUMENTS

| | | |
|---|---|---|
| WO | 2007147495 | 12/2007 |
| WO | 2012084507 | 6/2012 |
| WO | 2016019104 | 2/2016 |

OTHER PUBLICATIONS

Pappas, et al., "Smashing the Gadgets: Hindering Return-Oriented Programming Using In-Place Code Randomization", In Proceedings of the IEEE Symposium on Security and Privacy, May 20, 2012, 15 pages.

Onarlioglu, et al., "G-Free: Defeating Return-Oriented Programming through Gadget-less Binaries", In Proceedings of the 26th Annual Computer Security Applications Conference, Dec. 6, 2010, 10 pages.

* cited by examiner

*Primary Examiner* — Mohammad W Reza
(74) *Attorney, Agent, or Firm* — Dicke, Billig & Czaja, PLLC

(57) ABSTRACT

Systems and methods for the mitigation of return-oriented programming are disclosed. A return address for a function is encrypted to generate an encrypted return address. The encrypted return address is stored as the return address for the function. The encrypted return address can be decrypted prior to a return instruction of the function.

20 Claims, 2 Drawing Sheets

RETURN-ORIENTED PROGRAMMING MITIGATION

BACKGROUND

An aspect of computer security involves preventing the introduction of malicious code or the execution of malicious computation.

In a computer programming language with free pointers or non-checked array writes such as the C programming language, the mixing of control flow data which affects the execution of code (e.g., the return addresses or the saved frame pointers) and simple program data (e.g., parameters or return values) in a call stack is a security risk, possibly exploitable through stack buffer overflows as a common type of buffer overflow. One such attack involves filling one buffer with arbitrary executable code, and then overflowing the same or some other buffer to overwrite a return address with a value that points to the executable code. As a result, when the function returns, the computer executes that code.

Several solutions have been proposed to defend against memory corruption attacks and to increase the complexity of such two-step attacks. For example, this kind of an attack can be blocked with an executable space protection, such as a write-XOR-execute security feature or security features available under the trade designation Data Execution Prevention (DEP) from Microsoft Corp. of Redmond, Wash., U.S.A., included in operating systems, virtual machines and processors. For example, write-XOR-execute and DEP are memory protection policies in which every page in an address space of a process or kernel address may be either writable or executable, but not both. With such protection, an attacker cannot write processor instructions in an area of memory intended for data and then divert control flow to run those instructions.

One technique used to bypass executable space protections without injecting code includes reusing the functionality provided with the exploited application. For example, a "return-to-libc" attack usually begins with a buffer overflow in which a function return address on the call stack is replaced with an address of a function that is already present in the executable memory. An attacker can provide a frame on the stack and then transfer the program execution to the beginning of a library function. Because popular libraries (such as the standard library for the C programming language, or libc) include a wide range of functionality, this technique is sufficient to take control of a program.

An evolution and generalization of the return-to-libc attack includes return-oriented programming. Instead of necessarily jumping to the beginning of a library function, an attacker can chain together existing sequences of instructions called gadgets that have been identified in the existing program such as in function epilogues. Gadgets can end in a return instruction. Using return-oriented programming, an attacker can execute arbitrary algorithms (including loops and conditional branches) and achieve a Turing complete malicious computation. The large availability of gadgets allows an attacker to implement a functionality in several different ways, and is a way to evade security defenses such as executable space protection and code signing.

Return-oriented programming attacks can occur on many different architectures and have been demonstrated on complex instruction set computing (CISC) architectures, such as on systems running x86-based operating systems, and on reduced instruction set computing (RISC) architectures with strictly aligned instruction sets. Example RISC architectures include processor architectures available under the trade designation SPARC originally from Sun Microsystems and ARM from ARM Holdings of Cambridge, England, UK. Further, return-oriented programming is not limited to computer programs written in a particular programming language. Attackers can analyze the binary code of a programs or libraries of an operating system to determine whether the code can construct gadgets for return-oriented programming. Accordingly, servers, laptops, mobile device, and even architectures with immutable memory protections such as voting machines can be at risk from return-oriented programming attacks.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Systems and methods for the mitigation of return-oriented programming are disclosed. A return address for a function is encrypted to generate an encrypted return address. The encrypted return address is stored as the return address for the function. The encrypted return address can be decrypted prior to a return instruction of the function. In one example, a short sequence of reversible instructions are included in a function perilogue, such as a function prologue, to encrypt the return address before storing it on the stack. The order of operations can be reversed in a function epilogue to decrypt the encrypted return address before returning from the function call. An encryption cookie, such as a random value of a selected size, can be applied to encrypt the return address. In an example of a 64 bit ARM architecture, the encryption cookie can be stored in a callee register for use with the encryption and decryption.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
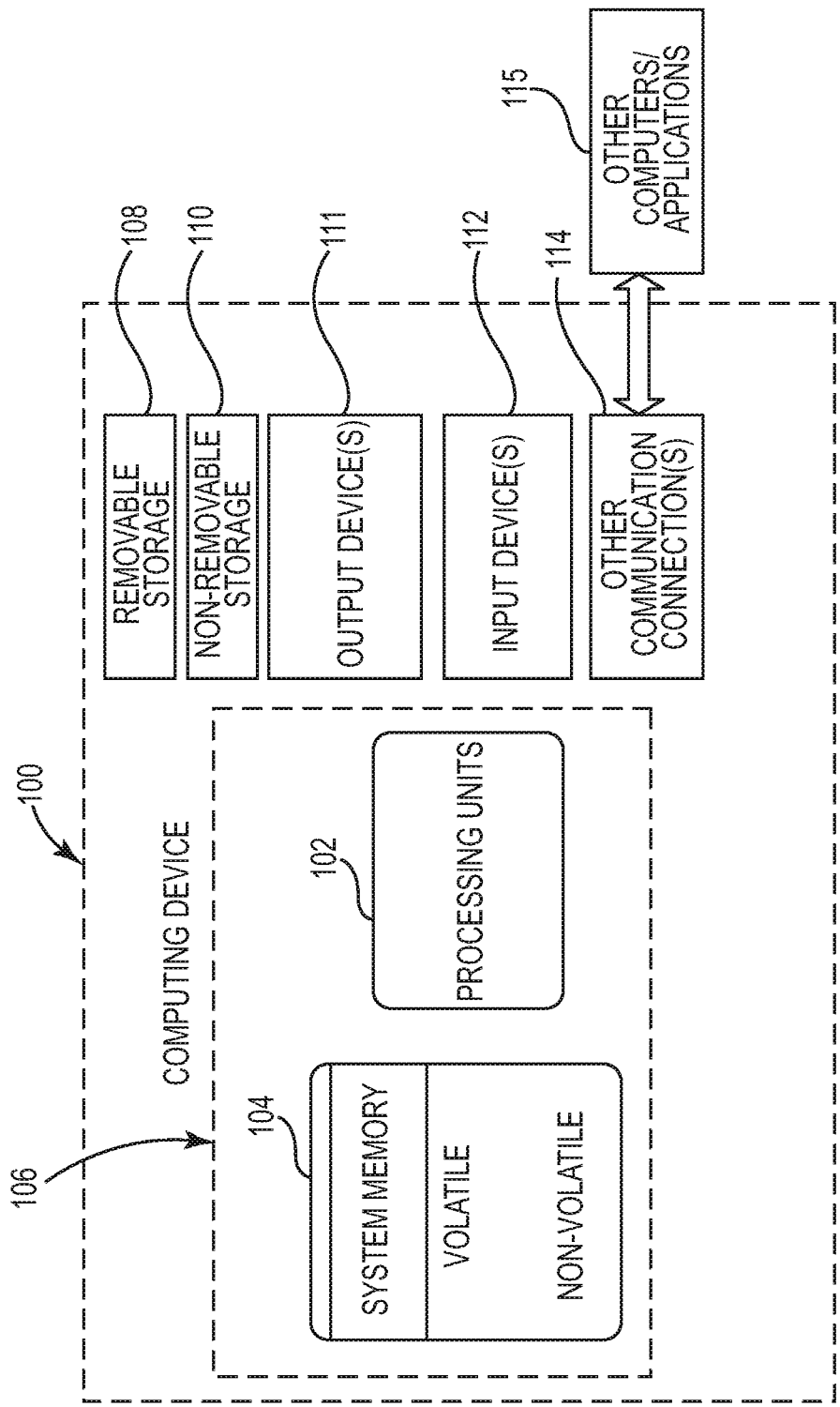
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100. The computer application, or computer program can be implemented as a set of instructions stored in the memory 104, and the processor 102 can be configured to execute the instructions to perform a specified task or series of tasks. In one example, the computer application can make use of functions either coded into the program itself or as part of library also stored in the memory 104.

A function is a sequence of computer program instructions packaged as a unit that perform a specific task. This unit can then be used in a program or programs in which that particular task is to be performed. Functions may be defined within programs or separately in libraries that can be used by multiple programs. A function is often coded so that it can be started or called several times and from several places during one execution of the program, including from other functions, and then branch back or return to the next instruction after the call, once the task is complete. In different programming languages, a function may be called a procedure, a subroutine, a routine, a method, a subprogram, or generically as a callable unit.

Most modern implementations of functions make use of a call stack, a case of the stack data structure often in a contiguous area of the memory 104, to implement function calls and returns. Each function call creates a new entry, or stack frame, at one end of the stack. When the function returns, the stack frame is deleted from the stack, and the space may be used for other function calls. Each stack frame can include the private data of the corresponding call, which typically includes parameters and internal variables, and the return address, i.e., the address of the instruction after the call. A call stack is used to keep track of the point to which each active function should return control when it finishes executing. An active function is one that has been called but is yet to complete execution after which control should be handed back to the point of call, or calling function. Some architectures may store a subset of this information, such as the return address, in processor registers.

Functions expressed in assembly language or machine language typically include function perilogues, including function prologues and function epilogues, which typically bracket the body of the function and can be used to manipulate the stack. Function perilogues include the programming that initializes and restores the execution environment of the function. For example, the function prologue can include a few lines of assembly language programming code at the beginning of a function that prepares the stack and registers for use within the function. Similarly, the function epilogue appears at the end of the function and restores the stack and registers to the state they were in before the function was called. A function epilogue typically includes the function exit point or return instruction such as the ret mnemonic in x86 assembly language.

In some examples, a function prologue pushes current base pointer onto the stack, so it can be restored later and assigns the value of stack pointer (which is pointed to the saved base pointer) to base pointer so that a new stack frame will be created on top of the old stack frame. Additionally, the function prologue can move the stack pointer further by decreasing or increasing its value, depending on whether the stack grows down or up. For example, the stack pointer can be decreased to make room for a function's local variables. In some example, the function prologue can push incoming arguments into registers.

The function epilogue reverses the actions of the function prologue and returns control to the calling function. In some examples, the function epilogue drops the stack pointer to the current base pointer, so room reserved in the function prologue for local variables is freed, and pops the base pointer off the stack, so the base pointer is restored to its value before the function prologue. Additionally, the function epilogue returns to the calling function, by popping the previous frame's program counter off the stack and jumping to program counter.

A typical computer program includes a series of machine instructions set out in a text segment stored in the memory 104. Each instruction is a byte pattern that, when interpreted by the processor 102, induces some change in the state of the program. The instruction pointer governs the order of the instructions (i.e., which instruction will be fetched next) and automatically advances to the next instruction in sequence, which may include jumps or transfers of control flow.

A return-oriented program is made up of a particular layout of a segment of memory, such as the stack. For example, each return-oriented instruction is a word on the stack pointing to an instruction sequence, in the sense of the typical program above, located in the memory of an exploited program. The stack pointer can govern the return-oriented instruction sequence to be fetched. When a return instruction (such as a return instruction in a function epilogue) is executed, the word to which the stack pointer points is read and used as the new value for the instruction pointer. Also, the stack pointer is incremented to point to the next word on the stack. If the instruction sequence now being executed by the processor also ends in a return instruction, the process is repeated to advance the stack pointer and induce execution of another instruction sequence. Thus, while a processor automatically fetches the next instruction and advances the instruction pointer for a typical program (and in an instruction sequence), the return instruction at the end of the instruction sequence fetches the next instruction sequence for a return-oriented program.

A return-oriented program is expressed with a sequence of gadget frames placed in an attacker-controlled memory segment of an exploited process, such as the stack or heap. In general, a gadget frame is an arrangement of words in the attacker-controlled memory segment and includes one or more instruction sequence pointers and can include associated values used as the data source that encodes a logical unit. The gadget frames are configured to fetch a return-oriented sequence of instructions known as gadgets.

A gadget is a sequence of instructions that provides an operation for the return-oriented program. Every instruction sequence ending in a target address that can be determined at runtime, such as a return instruction, is potentially usable as a gadget. One example source of such sequences includes function epilogues and exits in a target library such as libc. On CISC platforms in which instructions are variable-length and unaligned, gadgets can include "unintended instructions" such as jumps to the middle of existing instruction sequences. Gadgets on RISC platforms are restricted to strictly aligned instructions of a selected byte width.

Gadgets operate as a return-oriented instruction set, and are the target of an assembler of a return-oriented compiler. To execute a gadget, the stack pointer (and link register in an ARM architecture) first points to the first word in the gadget and the processor executes a return instruction. Each gadget is constructed so that when the return instruction in the last instruction of the sequence is executed, the stack pointer points to the next gadget to be executed. With these conditions in place, a return-oriented program will execute correctly, one gadget after another.

A return-oriented program is one or more gadgets arranged so that, when executed, affect the intended behavior of an attacker. A payload including the gadget frames is placed in the memory of an exploited process, and the stack pointer is redirected to point to the first gadget. In one example, this can be accomplished with a buffer overflow of the stack. The gadget frames are placed on the overflowed stack so the first has overwritten the saved instruction pointer of some function. When that function attempts to return, the return-oriented program is executed instead. The gadgets themselves are located in a runtime image of the exploited program, which includes the program itself as well as the libraries that have been loaded into the program, and the gadgets can be located in the function epilogue of a binary. The variables for use with the gadgets can be stored in an accessible read and write area of memory.

Traditional defenses against stack smashing protections including a compiler flag or compiler option available under the trade designation/GS from Microsoft Corp. in the C and C++ compilers can provide a defense orthogonal to execution space protections. In some cases, however, return-oriented attacks can be achieved without stack smashing.

A number of defenses have been developed for return-oriented programming attacks including control-flow integrity systems that prevent the control flow a target program from being hijacked. An example of a control-flow integrity system includes a "shadow stack." In general, a shadow stack can maintain control-flow integrity by mitigating return address overwrites such as during exploitation of a stack buffer overflow. The technique is to first keep a record of the legitimate return address for some function call in a software-protected data structure such as an operating system protected segment of memory, and then to check that the return address is still correct before returning. This can be accomplished with additional instructions to function calls and function epilogues. On calls, instructions store the legitimate return address is stored on the shadow stack; and on returns, instructions check the return address before actually returning. Whereas a stack buffer overflow would be adequate to overwrite the return address on the stack, such an overflow would not overwrite the shadow stack's record of the return address. If the return addresses on the stack and the shadow stack differ, the check inserted before the return instruction will fail.

While a shadow stack and other control flow integrity systems include a runtime overhead that is acceptable for many applications, the expense of developing such systems is relatively high, which leaves some newer architectures without protection while protection systems are in development. Additionally, shadow stacks can break backwards compatibility of processor systems.

Figure 2:
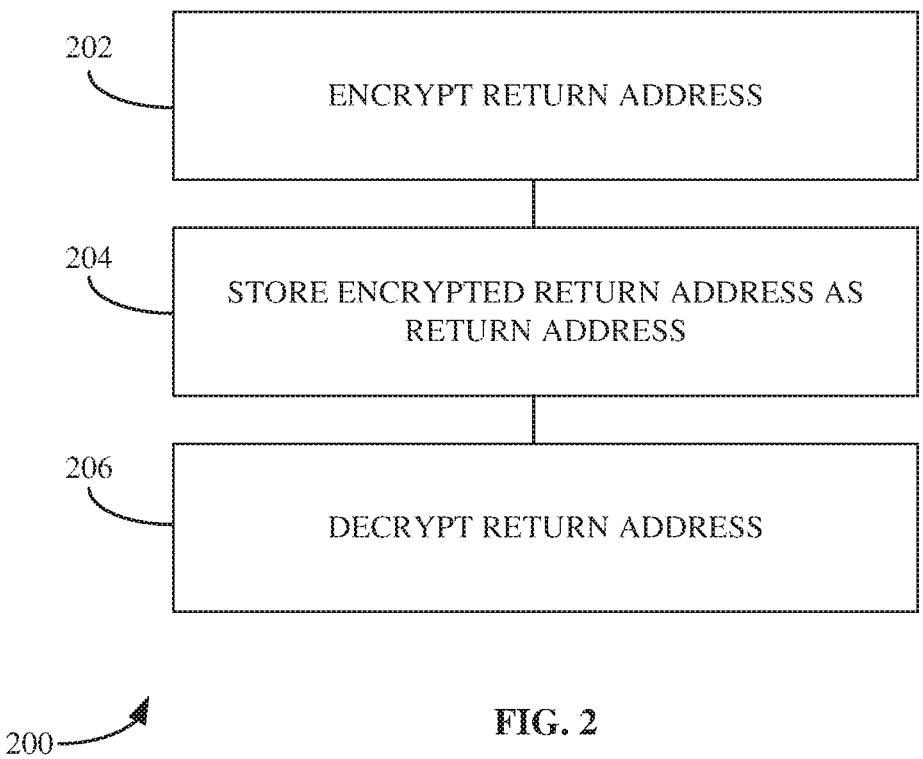
FIG. 2 is a block diagram illustrating an example method for execution in the computing device of FIG. 1.

FIG. 2 illustrates an example method 200 for use with functions to provide security for return-oriented programming attacks. Method 200 provides relatively low development cost and low overhead protection against return-oriented programming attacks that can be applied in lieu of or in addition to other viable mitigations. In one example, a return address of a function is encrypted at 202. The encrypted return address is stored as the return address for the function at 204. For example, a sequence of instructions can be included in a function perilogue, such as the function prologue, to encrypt the return address, which can be stored on the stack or elsewhere as the encrypted return address. In this example, the return address is encrypted during the function call. Prior to the function returning, the encrypted return addressed is decrypted at 206. The decrypted return address is applied as the return address in the program. In one example, a sequence of instructions to decrypt the return address can be included in the function epilogue and can reverse the order of operations of encryption.

Figure 3:
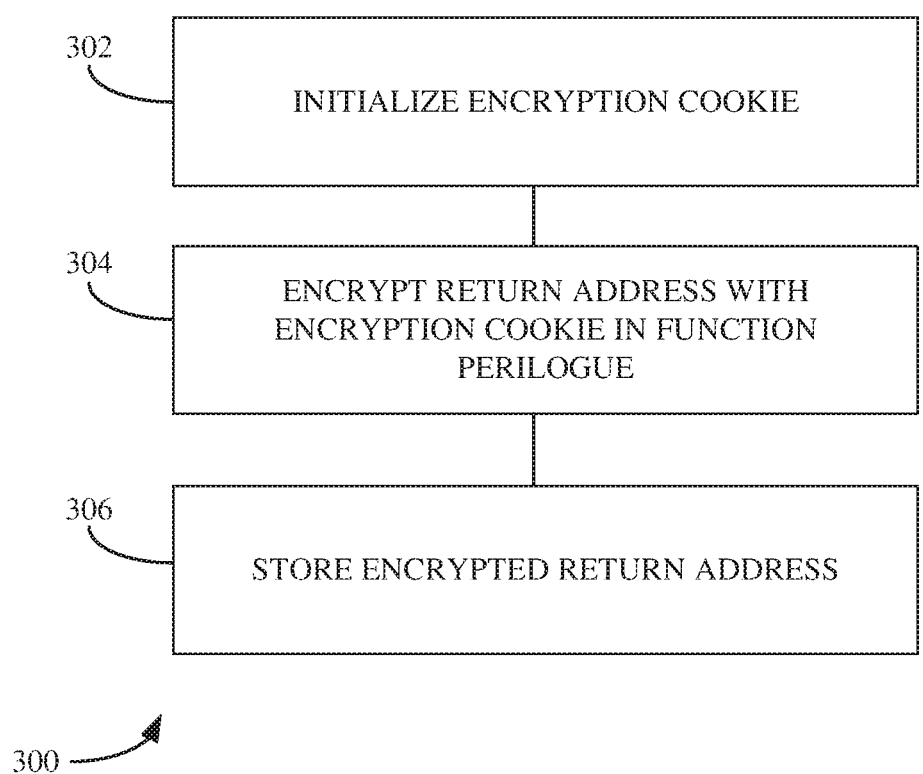
FIG. 3 is a block diagram illustrating an example method of the method of FIG. 2.

FIG. 3 illustrates an example method 300 to encrypt the return address at 202 and store the encrypted return address at 204. An encryption cookie is initialized in a long-lived memory at 302. The encryption cookie can be initialized to a random value of a selected size from the processor counters. In one example, the encryption cookie is initialized at system boot. An example of a long-lived memory is a callee register, or nonvolatile register, available on many popular processor architectures. The encryption cookie can be stored in a callee register and preserved across function calls. In response to a function call, the return address is encrypted with the encryption cookie in the function perilogue, such as the function prologue, at 304. The encrypted return address is stored as the return address at 306. In an example, the encrypted return address can be stored on the call stack.

In one example, method 300 can be performed in multiple iterations of encryption using one or more encryption cookies. For example, additional encryption cookies could be stored in other registers such as other callee registers or the stack pointer. Further, the encryption cookie can be applied to decrypt the return address at 206.

In one example, method 300 can be implemented with an initialized encryption cookie stored in callee register such as ×28 and include values from link register lr, stack pointer register sp, and a temporary register such as ×9 with the example instructions in ARM 64 bit architecture mnemonics. The following instructions can be included in the function prologue to encrypt the return address at 202:

add lr,lr,×28
ror lr,lr,×28
mov ×9,sp
eor lr,lr,×9

In the example, the encryption cookie in is added to the return address in link register and stored in link register. The bits in the link register are rotated to change the data representation without destroying it as ror(destination, operand, shift value). For example, the least significant byte of the encryption cookie can be applied as the shift value. The value in the stack pointer register is place into the selected temporary register. Further, the stack pointer value in the temporary register and the encrypted value in the link register is subjected to an exclusive or and stored in the link register to complete an example of method 300. Variations to these instructions are contemplated. Other encryption techniques or ciphers are contemplated as well. The operations can be reversed at 206 with appropriate instructions added to the function epilogue to determine the return address.

In this particular example, an attack will attempt to decrypt the encrypted return address, which provides are relatively small attack surface. The strength of the attack is based on the amount of time used to find the encryption cookie based on the number of encrypted/decrypted return address pairs, which is based on the encryption properties of rotate and add. From experimentation, an attacker is not able to overcome the encryption in a timely manner, such as prior to a timeout mechanism to terminate the process, such as in a browser application. Such modifications provide an acceptable performance overhead for many applications. If further security is preferred, perhaps at the expense of additional overhead, method 300 can include features such as performing multiple iterations of encryptions, depending on impact to application performance as well as using additional cookies or the stack pointer for the additional encryptions and storing additional cookies in other selected callee registers.

The instructions for use with methods 200, 300 can be implemented via hardware, software such as by a compiler or at runtime. For example, a compiler is a computer program that can be stored in memory 104 and configured to run on processor 102 to transform source code written in a programming language, or source language, into another computer language, or target language, which can include a binary form such as object code. Often, the source language is a high-level programming language and the target language is a lower level language. The compiler can be incorporated into an integrated development environment, such as one available under the trade designation Visual Studio from Microsoft Corp. Additionally, the instructions for use with methods 200, 300 can be incorporated into a compiler flag or option for use with a compiler, such as the flag available under the trade designation/GS. In one example, the encryption cookie can include a random value having the same size as a pointer and also used as the cookie in a buffer overflow security check in a compiler flag.

In one example, instructions for use with method 200 can be implemented as part of the compiler so as not to affect hardware or operating system modification. The modifications to the function perilogues can be updated with software updates if exploits are later discovered or if additional or stronger is preferred. Further, method 200 as implemented above does not affect backwards compatibility of functions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method performed by a computer system, comprising:
   encrypting a return address for a function of a computer program, the function to perform a task of the computer program and having a function perilogue, the encrypting the return address to generate an encrypted return address using an encryption key with a first sequence of instructions in the function perilogue;
   storing the encrypted return address as the return address for the function; and decrypting the encrypted return address with a second sequence of instructions in the function perilogue.

2. The method of claim 1 comprising storing the encrypted return address on a call stack.

3. The method of claim 1 including decrypting the encrypted return address prior to returning from the function.

4. The method of claim 3 comprising encrypting the return address during a call of the function.

5. The method of claim 1 comprising encrypting the return address with an encryption cookie.

6. The method of claim 5 wherein the encryption cookie includes a random value of a selected size.

7. The method of claim 5 comprising storing the encryption cookie in a callee register.

8. The method of claim 5 comprising initializing the encryption cookie at system boot.

9. A computer readable storage device to store computer executable instructions to control a processor to:
   encrypt a return address for a function of a computer program to generate an encrypted return address, the function having a function perilogue, the return address encrypted using an encryption key with a first sequence of instructions in the function perilogue;
   store the encrypted return address as the return address for the function; and
   decrypt the return address for the function with a second sequence of instructions in the function perilogue.

10. The computer readable storage device of claim 9 the computer executable instructions to control the processor to:
    encrypt the return address in a function perilogue having a function prologue and a function epilogue.

11. The computer readable storage device of claim 10 the computer executable instructions to control the processor to:
    encrypt the return address in the function prologue.

12. The computer readable storage device of claim 10, the computer executable instructions to control the processor to:
    initialize an encryption cookie to encrypt the return address.

13. The computer readable storage device of claim 12, the computer executable instructions to control the processor to:
    add the return address to the encryption cookie to obtain a result and to rotate bits of the result.

14. The computer readable storage device of claim 12, the computer executable instructions to control the processor to:
    initialize an encryption cookie comprise instructions to initialize one encryption cookie.

15. The computer readable storage device of claim 9, the computer executable instructions to control the processor to:
    decrypt the encrypted return address in a function epilogue.

16. A system, comprising:
    a memory device to store a set of instructions; and
    a processor to execute the set of instructions to:
      encrypt a return address, the return address for a function of a computer program, to generate an encrypted return address using an encryption key with a first sequence of instructions in a function perilogue of the function;
      store the encrypted return address as the return address for the function; and
      decrypt the return address for the function with a second sequence of instructions in the function perilogue.

17. The system of claim 16 wherein the processor executes the set of instruction to:
    apply an encryption cookie to encrypt the return address.

18. The system of claim 17 wherein the encryption cookie is stored in a callee register.

19. The system of claim 16 wherein the encrypted return address is stored on the stack.

20. The system of claim 16, the processor to execute the set of instructions to:
    encrypt the return address in a function perilogue.

* * * * *